Jan. 22, 1963   J. A. SCHNARS   3,074,197
FISHING ROD HOLDER
Filed May 3, 1961   2 Sheets-Sheet 1

INVENTOR
JOHN A. SCHNARS
BY Donnelly, Mentag & Harrington
ATTORNEYS

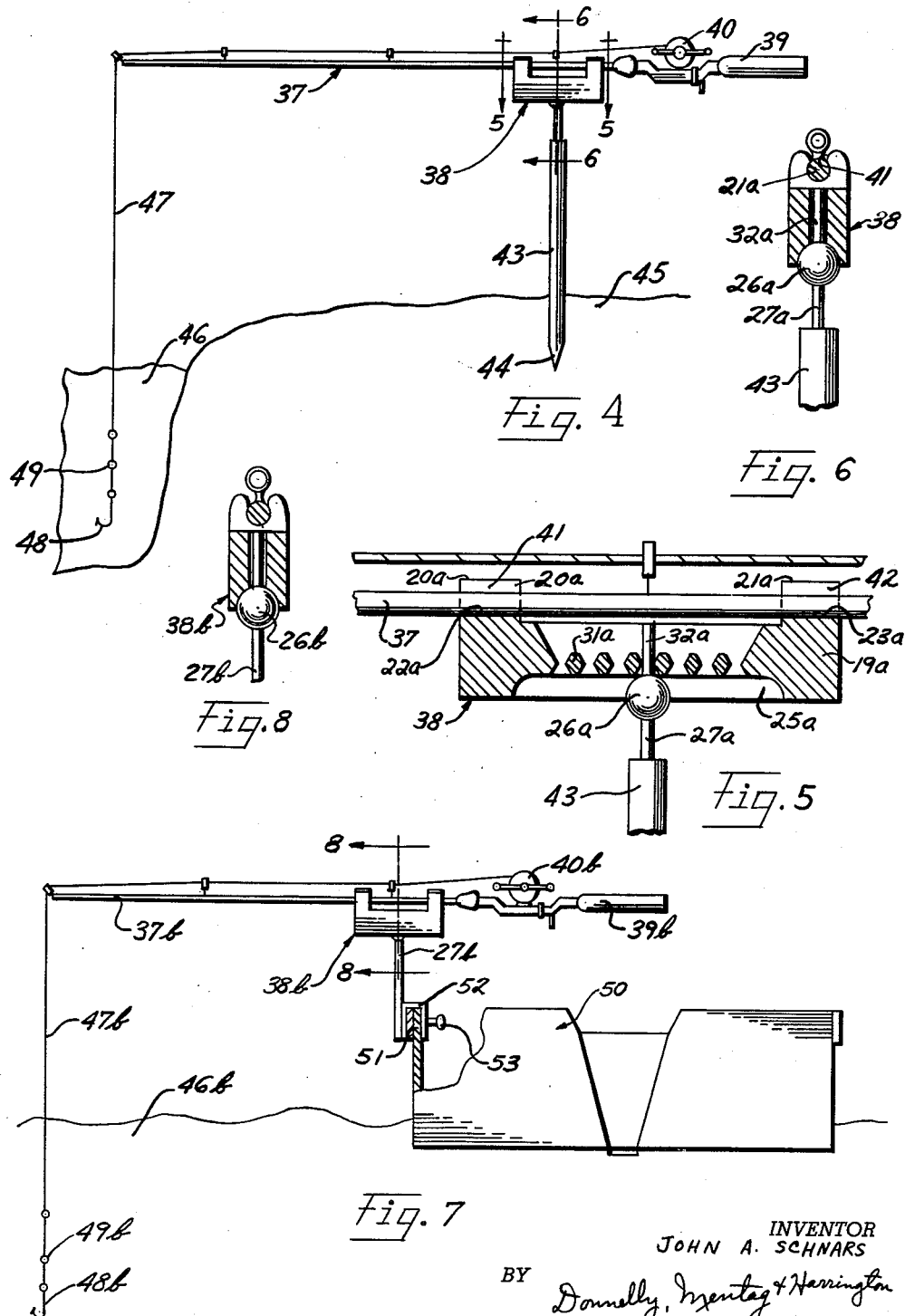

United States Patent Office 3,074,197
Patented Jan. 22, 1963

3,074,197
FISHING ROD HOLDER
John A. Schnars, 8887 Treadway, Detroit 14, Mich.
Filed May 3, 1961, Ser. No. 107,443
5 Claims. (Cl. 43—19.2)

This invention relates generally to fishing apparatus, and more particularly to a novel and improved still fishing rod holder.

It is common practice in the fishing art for a single fisherman to employ a plurality of rods and lines when fishing either through a hole in the ice when fishing in the winter, or when fishing from a boat or the land, as from a pier or breakwater, at other times of the year. In the past there has been provided mechanically operated devices for rocking an unattended fishing rod to impart normal luring movements to the rod. Such prior art mechanical rocking devices are complicated and expensive and require a source of electrical power. Accordingly, it is an important object of the present invention to provide a fishing rod holder which will impart a rocking movement to a fishing rod so as to reproduce normal luring movements which are normally imparted to a fishing rod by manual movement, and which fishing rod holder may be used for winter through-the-ice fishing or for fishing from a boat or pier.

The fishing rod holder of the present invention is adapted to impart the rocking movement to the fishing rod without the use of any power driven apparatus.

It is another object of the present invention to provide a novel and improved fishing rod holder which is simple and compact in construction, economical of manufacture, efficient in operation and light in weight.

It is a further object of the present invention to provide a fishing rod holder which will provide a rocking movement to a fishing rod and which may be incorporated in the fishing rod structure or made as a separate unit and attached to a fishing rod.

It is still another object of the present invention to provide a fishing rod holder which includes a supporting bracket which is adapted to be clamped to a fishing rod and wherein said bracket is rockably mounted on a ball-shaped fulcrum which is provided with means for supporting the ball-shaped fulcrum on the ice for winter fishing or on the gunwale of a boat or on the bank of a river or the like.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 4 is a side elevational view of a second embodiment of the invention;

FIG. 5 is an enlarged, fragmentary, longitudinal elevational view, with parts in section, of the structure illustrated in FIG. 4, taken along the line 5—5 thereof and looking in the direction of the arrows;

FIG. 6 is a fragmentary, enlarged, elevational view, with parts in section, of the structure illustrated in FIG. 4, taken along the line 6—6 thereof and looking in the direction of the arrows;

FIG. 7 is a side elevational view of a third embodiment of the invention; and,

FIG. 8 is an enlarged, fragmentary, elevational view, with parts in section, of the structure illustrated in FIG. 7, taken along the line 8—8 thereof and looking in the direction of the arrows.

Figure 1:
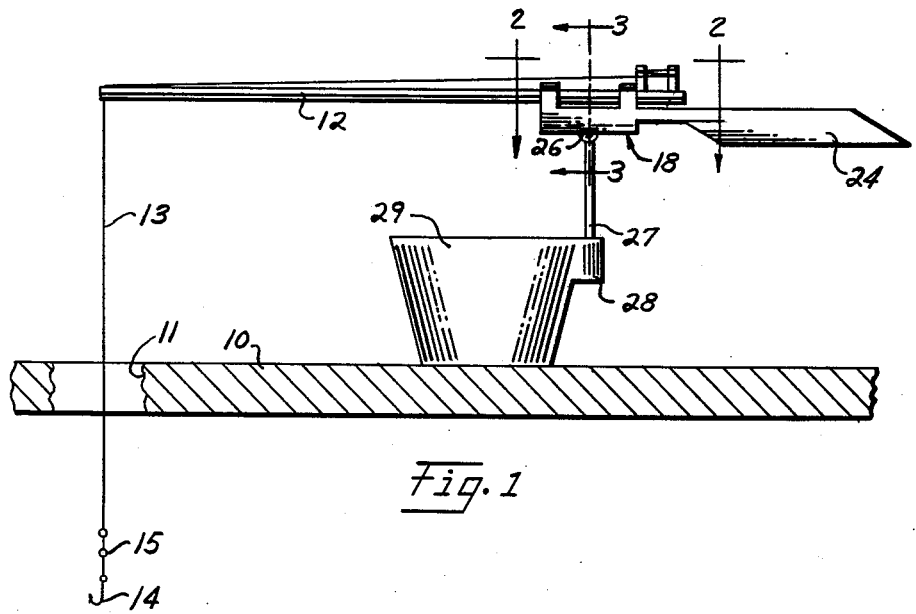
FIG. 1 is a side elevational view of a fishing rod holder made in accordance with the principles of the present invention.
Figure 2:
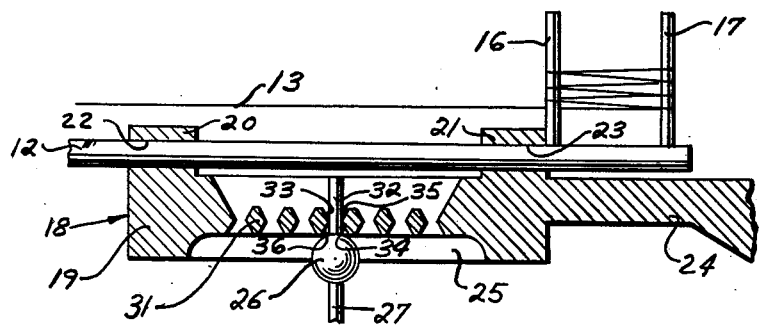
FIG. 2 is a fragmentary, enlarged, elevational view, with parts in section, of the structure illustrated in FIG. 1, taken along the line 2—2 thereof and looking in the direction of the arrows.
Figure 3:
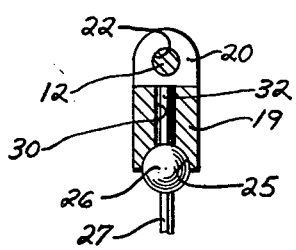
FIG. 3 is a fragmentary, enlarged, elevational view, with parts in section, of the structure illustrated in FIG. 1, taken along the line 3—3 thereof and looking in the direction of the arrows.

Referring to FIGS. 1, 2 and 3 of the drawing, wherein is shown a first embodiment of the invention, the reference numeral 10 indicates a layer of ice having a hole 11 made therethrough for winter fishing. The numeral 12 indicates a fishing rod having the usual fishing line 13 mounted thereon and extended downwardly through the hole 11 through the ice 10 and into the water below. The line 13 is provided with the usual hook 14 and the sinkers 15. Fixedly mounted on the rear end of the fishing rod 12 is the pair of spaced apart upwardly extended pegs 16 and 17 for winding therearound the excess portion of the line 13.

As shown in FIGS. 1, 2 and 3, the fishing rod holder of the present invention includes a bracket, generally indicated by the numeral 18, which is adapted to be clamped to the rod 12 so as to pivotally mount the rod 12 for rocking movement in a single vertical plane about a ball-shaped fulcrum with the rod 12 and the bracket 18 acting as a lever. The bracket 18 comprises the body 19 which is provided with the spaced apart upwardly extended arms 20 and 21. As shown in FIG. 3, the arm 20 is provided with the circular slot 22 for the reception of the rod 12. The arm 21 will be provided with a similar longitudinally extended hole therethrough as 23. The rod 12 may be assembled onto the bracket 18 by sliding the same forwardly through the openings 23 and 22 in the arms 21 and 20, respectively. Integrally formed on the rear end of the bracket body 19 is the handle member 24 which also provides added weight for balancing purposes, as more fully described hereinafter.

As shown in FIGS. 2 and 3, the bracket body 19 is provided with the longitudinally extended centrally disposed slot 25 on the lower side thereof. The slot 25 is provided with a concave shape for the mating reception of the ball-shaped fulcrum member 26. The ball-shaped member 26 is fixedly connected to the vertical arm of rod 27. The lower end of the rod 27 is fixedly mounted by any suitable means in the side wall 28 of a suitable water bucket 29. The bucket 29 would be filled with water and disposed on the ice 10 in a position adjacent the hole 11 whereby the line 13 would extend downwardly therethrough. The bucket 29 is preferably made from a suitable plastic material or any other deformable or pliable material and provided with inwardly and downwardly tapered sides as shown in FIG. 1. The downwardly shaping formable walls of the bucket 29 will permit the same to be quickly and easily removed from the ice 10 after a fishing session.

As shown in FIGS. 2 and 3, the bracket body 19 is provided with a centrally disposed, vertically extended, longitudinal slot 30 which is formed through the body 19 and which communicates at the lower end thereof with the longitudinal slot 25. The lower end of the longitudinal slot 30 is partially enclosed by a plurality of longitudinally spaced apart, transverse rods 31, as shown in FIG. 2.

The transverse rods 31 are substantially diamond shaped in cross section and are spaced apart a distance equal to the diameter of the rod 32 which extends upwardly from the upper end of the ball-shaped fulcrum 26 and which is aligned with the supporting rod 27. As shown in FIGS. 2 and 3, the fulcrum rod extension 32 terminates adjacent the upper side of the bracket body 19. It will be seen that the aforedescribed structure permits the bracket 18 to be pivoted on the ball-shaped member 26 with a rocking movement and in a fore and aft direction in a vertical plane. The bracket 18 may pivot in a plane about the axis of the rod 27, but it cannot tip sidewise as clearly shown by the structure in FIG. 3. The diamond cross sectional shape of the transverse rods 31 limits the forward and rearward rocking movement of the rod 12. This limiting of the rocking movement can best be seen by considering the structure illustrated in FIG. 2. If the bracket 18 is rocked rearwardly or clockwise as viewed in FIG. 2, the upwardly and forwardly tapered surface 33 on the transverse rod 31 to the front of the rod 32 will be engaged. Simultaneously, the downwardly and rearwardly sloping surface 34 on the transverse rod 31 positioned to the rear of the rod 32 will be engaged. When the bracket 18 is rocked forwardly or counter-clockwise as viewed in FIG. 2, the transverse rod surfaces 35 and 36 will be engaged to limit the forward rocking movement. The vertical flat handle member 24 is adapted to be engaged by the wind and act as a sail, whereby the fishing rod 12 will be rotated about a vertical axis through the rod 27. The fishing rod will be swung horizontally sidewardly and the fishing line 13 will engage the side of the hole 11 in the ice 10 and the sinker 15 and hook 14 will be raised. When the pole 12 is turned to a point where the wind slides off of the same, or is not engaging the handle 24 to turn it further, the weight of the sinker will take control over the swinging action of the pole 12 and will go down by gravity, whereby the pole 12 will swing backwardly until the handle 24 is again engaged by the wind and the entire swinging process will be repeated. During the swinging movement the pole 12 is provided with a slight rocking movement in the vertical plane. The balancing of the bracket 18 relative to the rod 12 may be quickly and easily carried out by mounting the rod 32 between the proper transverse rods 31 by a trial and error method in the well known manner of balancing a lever on a wedge or fulcrum. The seven holes between the transverse rods 31 provide a wide range of settings or adjustments to permit the user to quickly and easily obtain the proper longitudinal balancing of the fishing rod 12.

Experience has shown that a fishing rod holder of the present invention permits a winter fisherman to employ a plurality of fishing rods and obtain a rocking movement of the same with a device which is economical and yet efficient. The fishing rod holder of the present invention may be made from any suitable material as, for example, aluminum, a plastic material or the like.

FIGS. 4, 5 and 6 illustrate a second embodiment of the invention which is adapted to be snapped onto a conventional fishing rod generally indicated by the numeral 37. The rod supporting bracket 38 which is adapted to be clamped to the rod 37 is constructed in the same manner as the bracket 18, and the corresponding parts thereof are marked with similar reference numerals followed by the small letter "a." In the embodiment of FIGS 4, 5 and 6, the bracket 38 is not provided with the rearwardly extended handle 24 since the fishing rod 37 is provided with normal handle and reel 39 and 40, respectively, which function as balancing weights in lieu of the handle 24. In the embodiment of FIGS. 4, 5 and 6, the bracket arms 20a and 21a are provided with the slots 41 and 42, respectively, through which the rod 37 is passed and snapped into position in the holes 22a and 23a.

In the embodiment of FIGS. 4, 5 and 6, the fulcrum supporting arm 27a is enlarged on the lower end thereof as indicated by the numeral 43, and this enlarged end 43 is provided with the sharpened point 44 on the lower end thereof for mounting the same in the ground or bank 45 adjacent a river as 46. It will be seen that a fishing rod holder of FIGS. 4, 5 and 6 is adapted to rockably support a fishing rod 37 on the bank 45 of the river 46 or on a pier so that the fishing line 47 may extend down into the water. It will be understood that the fishing rod 37 will be adjustably mounted in the bracket 38, lengthwise thereof, to balance the fishing rod 37 in the well known manner of balancing a lever on a wedge fulcrum. The balancing of the rod 37 and the bracket structure 38 on the ball-shaped fulcrum 26a would be accomplished by a trial and error method, but it will be understood that once the position of the bracket 38 on the rod 37 is determined, the fisherman can quickly and easily set up the fishing rod holding structure on the successive occurrences in a minimum of time. Whenever a fish nibbles on the bait on the hook the tip of the fishing rod 37 is tipped or rocked downwardly indicating that a fish is biting. If the fish leaves the bait and is not caught the fishing rod 37 rocks backwardly into its original balanced position.

FIGS. 7 and 8 illustrate a third embodiment of the invention in which the fishing rod holder is adapted to rockably support a fishing rod on a gunwale of a boat. The embodiment of FIGS. 7 and 8 is constructed similarly to the embodiment of FIGS. 4, 5 and 6, and the similar structure is marked by corresponding reference numerals followed by the small letter "b." The numeral 50 indicates a boat having the gunwale 51. In this embodiment, the fulcrum supporting rod 27b is fixedly mounted at the lower end thereof to the U-shaped clamping bracket 52 by any suitable means, as by welding. The bracket 52 is an inverted U-shaped or channel shaped structure and is adapted to be mounted over the gunwale 51 and be secured thereto by the lock screw 53. The fishing rod holder shown in FIGS. 7 and 8 functions in the same manner as the embodiment of FIGS. 4, 5 and 6.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A fishing rod holder, comprising: a supporting rod; means for holding the supporting rod in a vertical position; a ball-shaped fulcrum mounted on the upper end of said supporting rod; a bracket for connection to a fishing rod for mounting the same on said ball-shaped fulcrum for free rocking movement in a vertical plane; a first longitudinal slot in the lower side of said bracket; a second longitudinal slot in the upper side of said bracket and communicating at the lower end thereof with the first longitudinal slot; a plurality of transverse rods in said bracket along the lower end of said second longitudinal slot; an upper rod extended upwardly from the top of said ball-shaped fulcrum; and, said ball-shaped fulcrum being received in the first longitudinal slot in said bracket with the upper rod extended upwardly into said second longitudinal slot and disposed between an adjacent pair of said transverse rods in said bracket.

2. The fishing rod holder as defined in claim 1, wherein: said means for holding the supporting rod comprises a bucket.

3. A fishing rod holder as defined in claim 1, wherein: said means for holding the supporting rod comprises an enlarged rod having a pointed lower end.

4. A fishing rod holder as defined in claim 1, wherein: said means for holding the supporting rod comprises a clamping means for clamping the rod on a supporting structure.

5. In a fishing rod construction, the combination comprising: a fishing rod structure; a supporting rod; means for holding the supporting rod in a vertical position; a ball-shaped fulcrum mounted on the upper end of said supporting rod; a vertical longitudinal slot in said fishing rod structure along the one side thereof; said fishing rod structure being provided with a plurality of transverse openings along the other side thereof communicating with said longitudinal slot; an upper rod extending upwardly from the top of said ball-shaped fulcrum and being slightly smaller than said slot and openings; and, said upper rod extended upwardly through one of said openings into said longitudinal slot with the lower side of said fishing rod structure resting on said ball-shaped fulcrum, whereby said fishing rod structure may be freely rocked in a vertical plane and rotated about said upper rod.

References Cited in the file of this patent

UNITED STATES PATENTS

| | | |
|---|---|---|
| 368,652 | Class | Aug. 23, 1887 |
| 2,360,402 | Determan | Oct. 17, 1944 |
| 2,548,351 | Coombs | Apr. 10, 1951 |
| 2,720,395 | Panske | Oct. 11, 1955 |